Figure 1:
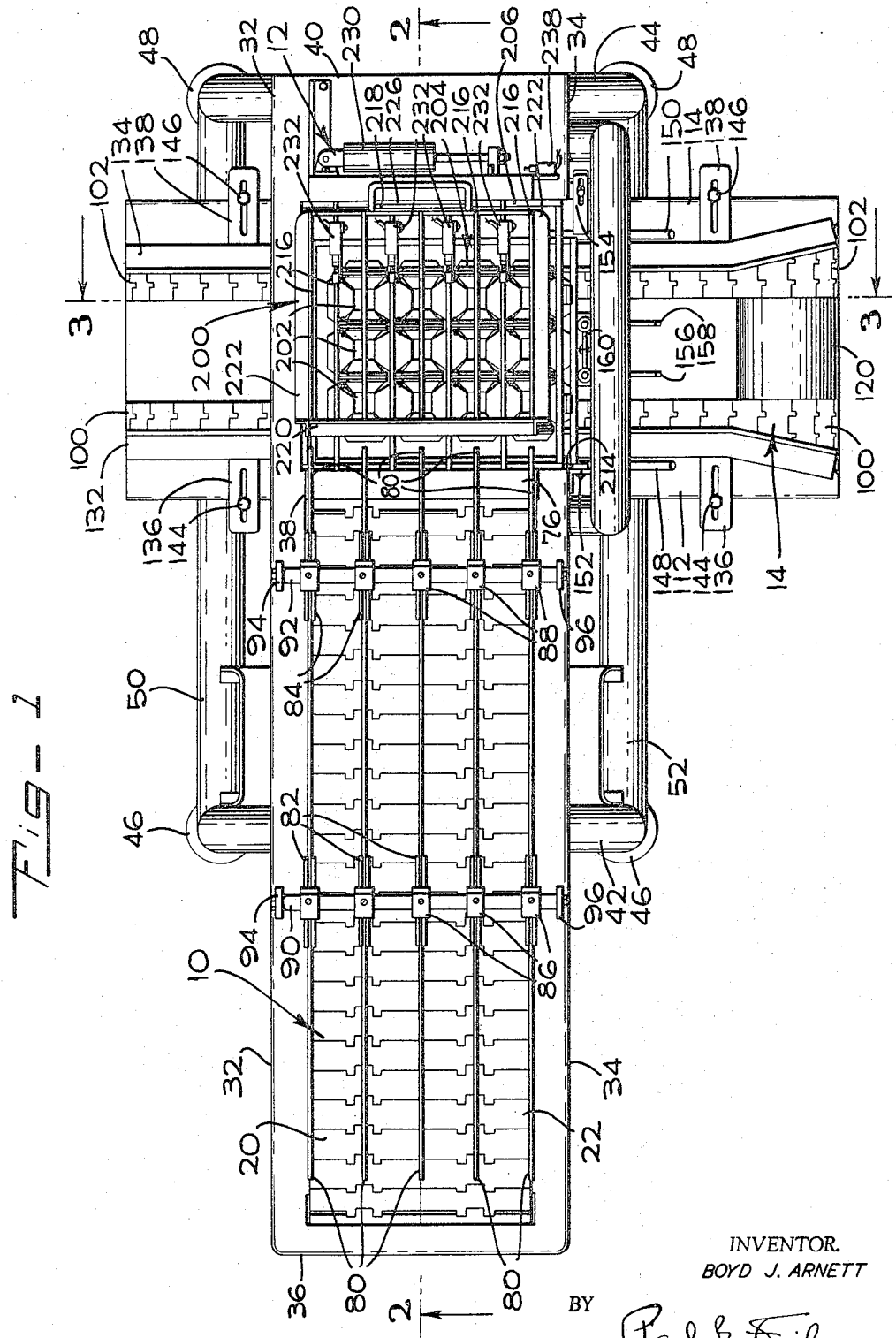

3,340,676
CARTON LOADING APPARATUS
Boyd J. Arnett, 22100 Summit Road, Los Gatos, Calif. 95030; Lillian J. Arnett, administratrix of the estate of Boyd J. Arnett, deceased
Filed Feb. 12, 1964, Ser. No. 344,338
1 Claim. (Cl. 53—247)

The present invention relates to carton loading apparatus, and more particularly to apparatus for gravity or drop-loading of bottles, cans, or other articles in the cartons.

For shipping and storage purposes, bottles, cans, and many other articles are closely packed into cartons. It will be immediately apparent that the articles, whether inserted manually or by carton loading apparatus, must be introduced into the carton with precision if the desired close, regular spacing is to be achieved. Some automatic apparatus has been developed in an effort to overcome the tedium and the time consumption of manual loading operations; but presently available carton loading apparatus represents at best a compromise between the requirement for high speed loading operations and the requirement for careful loading of the articles so that jamming, tearing of labels, destruction of cartons, and so forth are avoided. In the particular case of glass bottles, the dilemma is exaggerated in that the bottles are subject, of course, to breakage, and furthermore, are normally loaded into cartons with honeycomb inserts which form individual cells for the bottles, such cellular construction necessitating even greater precision in the insertion of the bottles into the carton. Thus, ultimately although several different carton loading devices have been developed and put into use, none have been capable of loading articles, and particularly bottles, into cartons at a rate commensurate with the rates obtainable by bottle filling machines so that the full capabilities of the latter have not been practically exploited.

It is a general object of the present invention to provide a carton loading apparatus that is capable of loading articles and particularly frangible bottles at a relatively high rate of speed but in a precise careful fashion so that bottle breakage, jamming and carton damage are effectively avoided.

More particularly, it is a feature of the present invention to provide improvements in carton loading apparatus such as disclosed in my prior patent application Ser. No. 149,078, filed Oct. 31, 1961, now Patent No. 3,142,948, issued Aug. 4, 1964, wherefore a full complement of articles may be accumulated at a transfer position and then dropped into a carton to complete in a single operation the entire loading.

It is an additional significant feature of the present invention to provide a carton loading apparatus wherein but a few simple adjustments and substitution of elements enable the loading of articles of variant size and number into cartons of required dimensions.

Yet more particularly, it is a feature of the invention to provide an article conveyor means arranged to deliver a plurality of articles in regimented file and row relationship to a transfer position for subsequent simultaneous drop-loading into a carton.

A related feature of the invention is the provision of guide members in association with the article conveyor which are not only arranged to assure the proper regimentation of the articles, but also arranged for easy adjustment to accommodate articles of different dimensions.

Another feature of the invention relates to the provision of a transfer mechanism which is arranged to receive a full complement of regimented articles delivered from the mentioned article conveyor and to subsequently deliver all of the articles simultaneously into a carton if and only if both the full complement of articles and the carton are in appropriate transfer relationship.

More particularly, it is a feature to provide such transfer mechanism including a laterally displaceable transfer member arranged to simultaneously actuate lateral displacement of all articles so that their simultaneous drop to a carton thereunder is assured.

Additionally, it is a feature of the invention to provide an article transfer guide mechanism in the form of a grid-like structure arranged to control descent of each individual article into a carton.

If such carton is provided with interior partitions, it is an additional feature of the invention to provide means for automatically positioning the cartons and the partitions therewithin for proper reception of the transferred articles.

Additionally, it is a feature of the invention to provide an article guide mechanism, as mentioned, which includes a plurality of spring fingers arranged to enter the compartments formed within the carton and thereafter to expand laterally into engagement with the walls and partitions of the carton both to assure proper disposition of the carton for loading operation and to positively guide articles into such carton.

In addition, it is a feature of the invention to provide an article guide mechanism arranged to minimize tearing or other destruction of the labels present on the transferred articles.

It is an additional feature of the invention to provide an article displacing member and an article guide grid as mentioned hereinabove, each of which is replaceable as a unit when articles of different dimensions are to be loaded into a carton.

It is another feature of the invention to provide an elevator structure for a carton so that the same may be raised into operative relationship with the aforementioned guide grid not only to assure proper carton positioning but also to minimize the amount of drop of the articles into the carton.

A related feature of the invention is the provision of a resilient support for such carton elevator to minimize shock when articles are received within the carton and thus reduce the possibility of bottle breakage to a nullity.

Another feature of the invention is to provide means for engaging the flaps of a carton to maintain the same in opened disposition during the loading operation and more particularly to maintain such open-flap disposition whether the carton elevator be raised or lowered.

Additionally, it is a feature of the invention to provide a carton conveyor arranged to engage and frictionally propel a carton to and from an article loading or transfer position whereat the aforementioned carton elevator is operative.

It is another feature of the invention to provide a carton conveyor having means associated therewith to assure presentation of successive cartons at the loading or transfer position in controlled successive relationship so that although loading is expedited, accuracy of carton disposition for the loading operation is assured.

Figure 2:
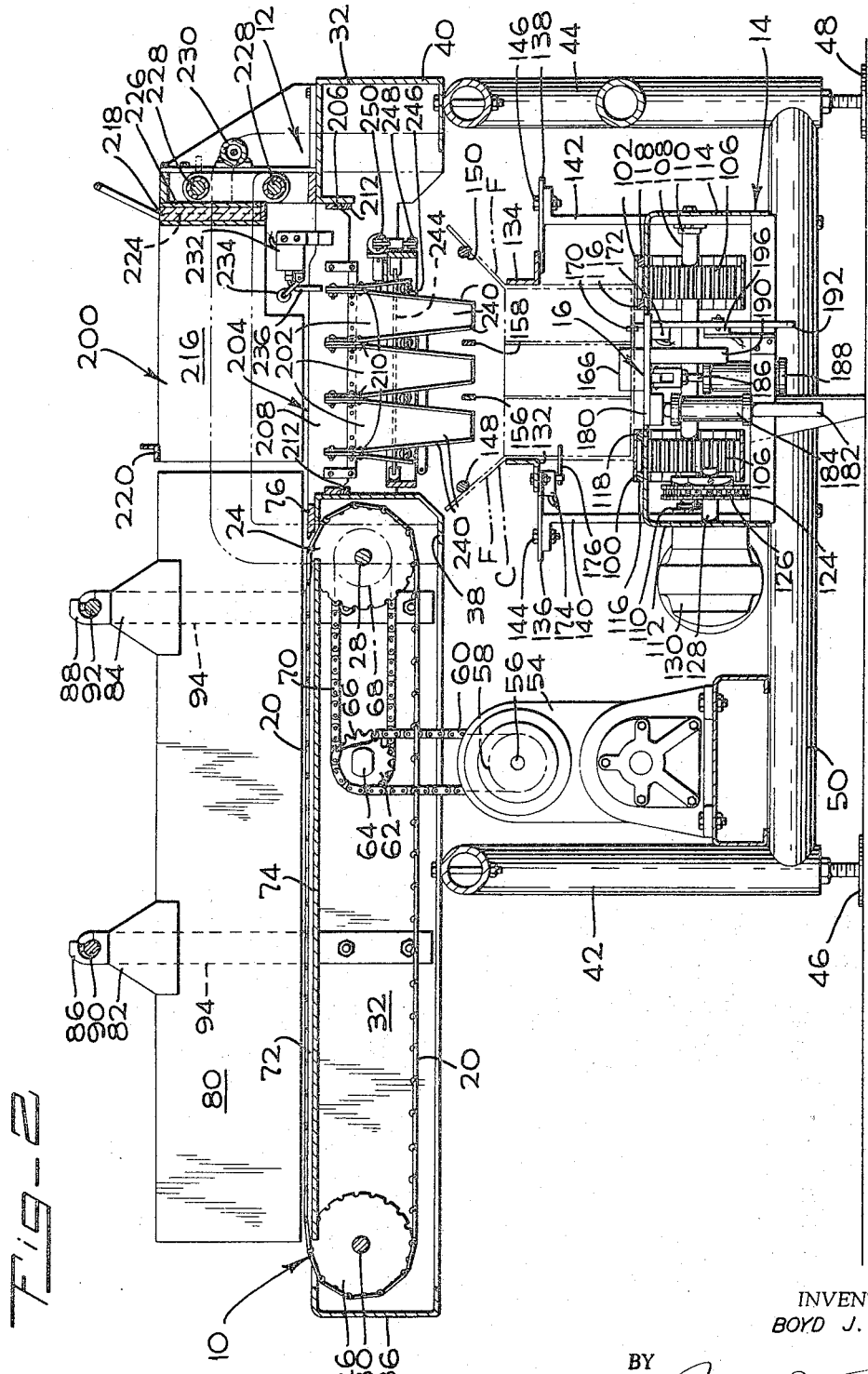
Figure 3:
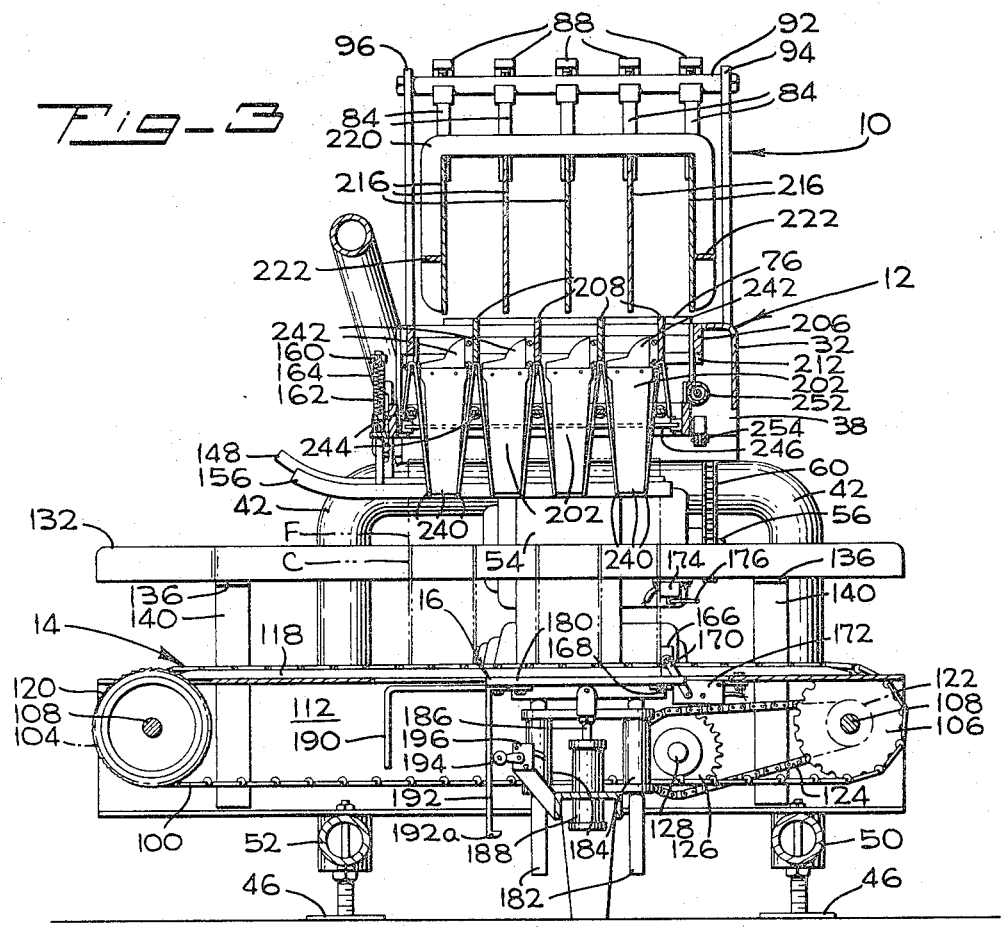
Figure 4:
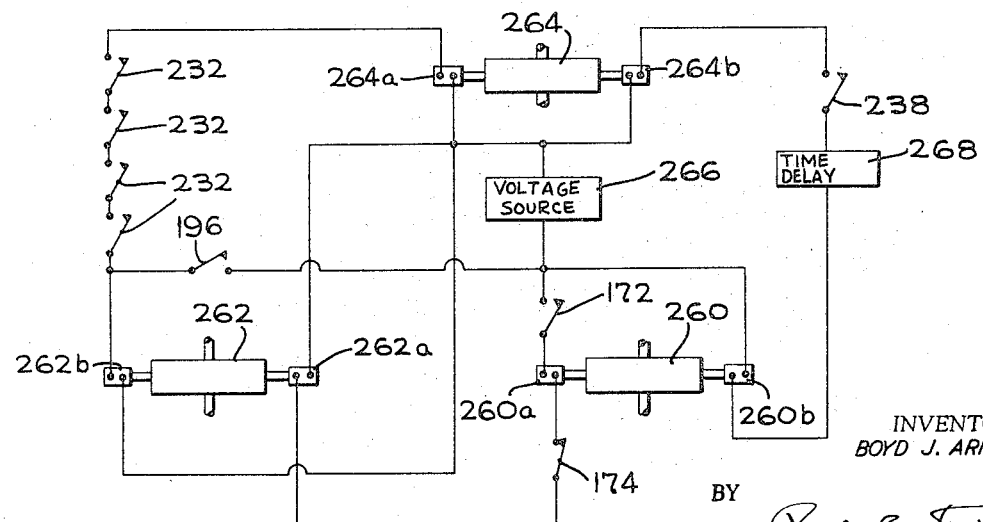

These as well as other objects and features of the invention will become more apparent from a perusal of the following description of the exemplary embodiment of the invention shown in the accompanying drawings wherein:

FIG. 1 is a top plan view of a carton loading apparatus embodying the invention, FIG. 2 is a longitudinal vertical sectional view taken substantially along line 2—2 of FIG. 1, FIG. 3 is a transverse vertical sectional view taken substantially along line 3—3 of FIG. 1, and FIG. 4 is a schematic diagram of the electrical circuit associated with the apparatus shown in FIGS. 1, 2, and 3 to control operation thereof.

Generally, in accordance with the present invention, the illustrated carton loading apparatus includes an article conveyor 10 that is adapted to receive and frictionally propel bottles or other articles in multi-file relation along a generally horizontal path to a transfer mechanism 12. A carton conveyor 14, disposed at a lower level, is arranged to frictionally propel empty, open cartons C in upright disposition to a position underneath the transfer mechanism 12 whereat a carton elevator 16 is arranged to lift an individual carton into article receiving position whereupon the transfer mechanism 12 can instigate transfer of a full complement of articles received from the article conveyor into the carton thereunder to fill or load the same. The transfer mechanism 12 is energized in response to the presence of a full complement of articles at the transfer position and the presence of an empty carton C in receiving position on the carton elevator 16 thereunder thus to effect expeditious loading of the cartons but at the same time assure that such loading is accomplished in a precise fashion.

More particularly, the article conveyor 10 is formed by a parallel pair of edgewise-abutting endless flap top conveyor chains 20, 22 that are trained about parallel spaced sprockets 24, 26 on two appropriately positioned shafts 28, 30 extending between parallel U-channel members 32, 34 that form the sides of an elongated substantially horizontal frame, such U-channel members being rigidly joined at their extremities and also at an intermediate position by other U-channel members 36, 38, 40 so that the entire horizontal frame is of open box-like configuration.

A portion of such elongated horizontal frame carries the described article conveyor 10, the remainder thereof being arranged to provide support for the mentioned transfer mechanism 12. The elongated box-like frame is firmly supported in its mentioned horizontal disposition on legs 42, 44 which are formed by two tubular members of inverted U-shaped configuration, an adjustable foot 46, 48 being secured to the lower-most extremity of each leg 42, 44 to enable height and leveling adjustments for the entire frame to be easily made. The lower ends of the legs 42, 44 are joined by tubular rungs 50, 52 which are arranged to support the aforementioned carton conveyor 14 and carton elevator 16 under the transfer mechanism 12 in a manner to be described in more detail hereinafter.

A variable speed drive motor 54 for the article conveyor 10 is also supported on these lower rungs 50, 52 of the frame and the output shaft 56 of the drive motor carries a sprocket 58 about which is trained a drive chain 60 that also drivingly encompasses a sprocket 62 on a stub shaft 64 at one side of the article conveyor frame. Another sprocket 66 on this shaft 64 is arranged in parallelism to a sprocket 68 on one of the supporting shafts 28 for the conveyor chains 20, 22 and a drive chain 70 is trained about these two latter sprockets 66, 68 thus to complete the drive connection between the article conveyor motor 54 and the flat top conveyor chains 20, 22. The motor 54 is driven so that the upper flights of the conveyor chains 20, 22 move from left to right as viewed in FIGS. 1 and 2 and because of their parallel, abutting dispositions form, in effect, a unitary frictional propelling surface that carries the articles from the left of the apparatus towards the transfer mechanism 12 located at the right as viewed in these same figures. To assure that the frictional propelling surface provided by the upper flights of the conveyor chains 20, 22 is perfectly flat, such upper flights are arranged to rest on and slidably move along tracks 72 on a horizontal plate 74 that is rigidly secured to the U-channel members 32, 34 forming the article conveyor frame as clearly illustrated in FIG. 2. An aditional plate 76 is supported at the top of the intermediate transverse frame member 38 so as to lie in the horizontal plane defined by the upper surface of the conveyor chains 20, 22 to provide a bridge across which the articles can move onto the transfer mechanism 12, as will be described in detail hereinafter.

To provide for the orderly regimented multi-file movement of the articles on the article conveyor, a plurality of partitions 80 are supported thereabove in appropriately spaced parallel relationship as best shown in FIG. 1, each partition extending substantially the entire length of the upper flight of the conveyor chains 20, 22 and slightly there beyond to assure control of the article disposition until the articles are received by the transfer mechanism 12. Each of the partitions 80 is suspended by a pair of brackets 82, 84 carrying C-clamp structures 86, 88 at their upper extremities that are adapted to encompass and releasably engage transversely extending rods 90, 92 that in turn are supported in bridging relation between upright supports 94, 96 bolted to the U-channel members 32, 34 on opposite sides of the article conveyor. The support is such that the lower edges of the partitions 80 are slightly above the propelling surface formed by the conveyor chains 20, 22. The C clamps 86, 88 permit easy lateral adjustment of the partitions 80 to accommodate articles of variant width and also removal of certain partitions whenever the number of article files is to be changed. It is to be expressly noted that such adjustment requires no change whatsoever in the structure or functioning of the conveyor chains 20, 22.

Like the described conveyor 10, the carton conveyor 14 is arranged to exert a frictional propelling force on the cartons C to move such cartons successively along a path extending generally transversely to the paths of articles on the article conveyor and at a lower level so that articles can be dropped by the transfer mechanism 12 into a carton thereunder. More particularly, the carton conveyor consists of a pair of endless, flat-top conveyor chains 100, 102 that are mounted in parallel, laterally-spaced relationship so that the flat upper flights of the conveyor chain are arranged to engage the bottom of a carton C adjacent its outer edges as clearly illustrated in FIG. 2. The endless conveyor chains 100, 102 are trained about spaced sprockets 104, 106, both sprockets at the corresponding ends of the two conveyor chains being mounted on a common shaft 108 supported for rotation at its opposite ends in suitable bearings 110 secured to the side of the carton conveyor frame formed by parallel U-channel members 112, 114 whose lower flanges are bolted to the rungs 50, 52 of the frame, as best shown in FIG. 3. Tracks 116, 118 are provided on the upper flanges of the U-channel members 112, 114 to engage the undersurface of the upper flights of both conveyor chains 100, 102 to maintain the same in flat horizontal dispositions. The sprocket-supporting shaft 108 at the input end of the conveyor disposed at the left as viewed in FIG. 3 also carries a friction roller 120 whose diameter is equivalent to that of the conveyor chains 100, 102 as they pass around the sprockets, such roller 120 serving to give added frictional impetus to an empty carton entering the apparatus.

The upper flights of the conveyor chains 100, 102 are arranged to move from left to right as viewed in FIG. 3 through drive connections to the sprocket shaft 108 on the right as viewed in FIG. 3. For this purpose, a small sprocket 122 is keyed to such shaft and a sprocket chain 124 is trained about this sprocket and another sprocket 126 mounted on the drive shaft 128 of a motor 130 mounted at one side of the carton conveyor frame as best shown in FIG. 2. Preferably, this motor 130 is also a variable speed motor enabling variation of the carton conveyor speed and accordingly the frictional propelling force exerted on the cartons thereby.

In order to guide a carton C during its conveyance, elongated guide rails 132, 134 are adjustably supported at opposite sides of the path of carton travel, such rails being supported adjustably by laterally extending arms 136, 138 which are secured to the upper ends of vertical support brackets 140, 142 that are in turn mounted at their lower ends on the channel members 112, 114 forming the carton conveyor frame. To provide the required adjustment, the arms 136, 138 are slotted so that they may be secured to the upper ends of the brackets 140, 142 in adjusted position by means of suitable connecting bolts 144, 146. The adjustment is of course made so that the sides of the carton C are slidingly engaged and the carton itself is centered over the pair of spaced conveyor chains 100, 102, as best shown in FIG. 2. It is to be observed that the described adjustment can be made to accommodate cartons of variant width yet no adjustment of the carton conveyor chains 100, 102 themselves is required. Preferably, the elongated guide rails 132, 134 are tapered outwardly adjacent the entrance end of the carton conveyor to facilitate entrance of a carton and preclude possible jamming at such position.

When the carton C is delivered to the entrance end of the described carton conveyor 14 in its upright disposition, all four flaps F thereof have been previously opened either manually or by flap opening apparatus such as described in my co-pending application Ser. No. 82,974, now Patent No. 3,141,279, issued July 21, 1964. The outwardly projecting side flaps F of the carton C are maintained in their opened disposition during conveyance through the apparatus by a pair of longitudinally extending rods 148, 150 that are adjustably supported from the frame by slotted brackets 152, 154, the preferred disposition being above and to the side of the path of carton travel as clearly illustrated in FIG. 2. Such disposition of the side flap engaging rods 148, 150 permits the carton to be raised by the mentioned carton elevator 16, as will be described hereinafter.

The end flaps F of the upright carton C are maintained in their previously opened disposition by another pair of parallel rods 156, 158 supported substantially centrally above the path of carton conveyance, as shown in FIG. 2 and FIG. 3. These rods are suspended at the lower ends of mounting bars 160 that are slidably supported in suitable brackets 162 secured to the frame of the transfer mechanism 12, as will be described hereinafter and are normally urged downwardly by compressed coil springs 164, which however can be further compressed to allow upward movement of the end flap engaging rods 156, 158 when a carton is raised by the carton elevator 16 to be described hereinafter. Accordingly, even though the carton C is moved both horizontally by the carton conveyor 14 and vertically by the carton elevator 16, continuous engagement of the side flaps and end flaps of the carton is maintained during the entire operation to assure readiness of the carton for reception of articles discharged from the transfer mechanism 12 thereinto.

A pivoted spring stop 166 is disposed between the conveyor chains 100, 102 to project upwardly into the path of carton travel at a position such that a carton will be impeded in its movement under the transfer mechanism. A torsion spring 168 urges the pivoted stop 166 into its upper disposition as shown in FIGS. 2 and 3 and is of sufficient strength to stop further motion of an empty carton. In other words, the frictional propelling force exerted on an empty carton C by the conveyor chains 100, 102 is less than the impeding force exerted by the spring stop 166. However, the spring force is insufficient to overcome the frictional propelling force exerted by the conveyor chains on a carton which has been loaded with articles and, as a consequence, after a carton has been loaded, it will push the stop 166 about its pivot below the surface of the conveyor chains 100, 102, thus to allow the loaded carton to proceed to the exit end of the carton conveyor 14.

Substantially adjacent the spring stop 166 is the pivoted actuating arm 170 of a normally open microswitch 172 mounted between the conveyor chains 100, 102. The arm 170 normally projects upwardly into the path of carton motion at a 45° angle opposed to the direction of motion and is positioned so that the arm 170 will be engaged and raised to an upright (90°) disposition by an advancing carton before the stop 166 precludes further carton motion. When so disposed, the arm 170 effects closure of the switch 172 to energize upward movement of the carton elevator 16, to be described below. A normally-closed microswitch 174 is mounted on one of the carton guide rails 132 so that an actuating arm 176 projects from the side into the path of carton travel beyond the described spring stop 166 and elevator energizing microswitch 172 and effects de-energization of the carton elevator 16 while a filled carton is leaving the transfer position on the carton conveyor 14, as will be fully explained hereinafter.

When an empty carton C has been stopped from further motion by the described pivoted stop 166, the carton is appropriately disposed beneath the transfer mechanism 12 and above the mentioned carton elevator 16. Such carton elevator 16 includes a large flat plate 180 secured at the upper extremity of a pair of rods 182 that slidably extend through vertical bushings 184 mounted from the carton conveyor frame, the plate normally resting in an inoperative disposition as shown in FIGS. 2 and 3 below the level of the upper flights of the conveyor chains 100, 102 and thus out of the path of carton motion. The elevator plate 180 is also secured to the upper end of a piston rod 186 forming part of a pneumatic actuating cylinder 188, also secured to the carton conveyor frame and arranged, upon actuation, to raise the elevator plate 180 vertically upwardly a desired distance to lessen the total vertical drop experienced by articles released from the transfer mechanism 12. Additionally, since the elevator plate 180 is, in effect, supported on a cushion of air, a shock absorption mechanism is provided which reduces the possibility of breakage of frangible articles dropped into the carton. So that cartons of variant lengths may be accommodated by the elevator, the described elevator plate 180 is sufficiently long to accommodate a rather short carton but has adjustably secured thereto an extension member constituting an elongated flat rod 190 that is slotted and can be adjustably bolted to the elevator plate so as to extend a desired distance therefrom between the conveyor chains 100, 102. The adjustment is made so that the extremity of the rod 190 is substantially aligned with the rear end of a carton whose front end has engaged the previously described spring stop 166. The extremity of the rod 190 is bent downwardly wherefore when the elevator plate 180 is raised to lift one carton, such downward projecting end of the rod engages the front end of a successive carton to preclude further advance thereof during a carton loading operation.

The elevator plate 180 also carries a downwardly projecting rod 192 whose lower end is hooked as shown at 192a in FIG. 3 and is arranged to engage the actuating arm 194 of a normally-open microswitch 196 mounted from the carton conveyor frame when the elevator plate 180 is fully raised. Closure of the microswitch 196 is a condition precedent to actuation of the transfer mechanism 12 described below.

When a carton C has been raised to receiving position by the carton elevator 16 and a full complement of bottles has been delivered to the transfer mechanism 12 by the article conveyor 10, a transfer member 200 is actuated to move all of the received articles over the upper entrance end of a plurality of guide channels 202 formed in a transfer guide 204 so that the articles can then drop directly into the carton thereunder to completely fill such carton. Both the article-displacing transfer member 200 and the transfer guide 204 are unitary replaceable structures so that both may be quickly replaced by other transfer members and transfer guides for accommodation of different articles and/or cartons.

Most particularly, the transfer guide 204 constitutes a generally rectangular grid-like structure including an outer rectangular frame 206 having longitudinal and transverse ribs 208, 210 arranged therewithin thus to form the upper ends of the mentioned guide channels 202 which are dimensioned to permit the vertical passage of articles therethrough. Two sides of the frame 206 are slidably supported on tracks 212 which extends transversely of the article conveyor frame thus enabling lateral removal of the transfer guide 204 when different articles or cartons are to be handled. When fully inserted in operative position as shown best in FIG. 1, the transfer guide 204 can be removably fixed to the conveyor frame by a single bolted connection 214. When so supported, the longitudinal ribs 208 of the transfer guide are disposed with their upper edges substantially in the article-supporting plane of the article conveyor chains laterally intermediate the article guide partitions 80. Accordingly, all articles that are frictionally propelled toward the transfer mechanism 12 are pushed onto these longitudinal ribs 208 of the transfer guide 204 and the force of successive articles on the article conveyor is sufficient to push preceding articles along such supporting ribs.

The upright and regimented dispositions of the articles on the receiving ribs 208 are maintained by the aforementioned transfer member 200 which consists of a plurality of partitions 216 that are disposed in alignment with the guide partitions 80 above the article conveyor 10. These transfer partitions 216 are secured at one end to a mounting plate 218 and at their other ends to a frame member 220 of inverted U-shaped configuration as best shown in FIG. 3, the latter frame member being joined rigidly to the mounting plate 218 by rigid braces 222 at opposite sides of the transfer member. A vertically disposed T-shaped slot 224 is formed exterior of the mounting plate 218 for slidable reception over a similarly dimensioned T-shaped bracket 226 mounted for lateral sliding movement on a pair of cylindrical rods 228 secured to the article conveyor frame and extending generally laterally relative to the direction of article conveyance. A pneumatic actually cylinder 230 is operatively connected to the slidable bracket 226 and upon suitable energization will move the entire transfer member 200 to the left as viewed in FIG. 3 thereby to displace articles on the longitudinal ribs 208 laterally into dispositions over the guide channels 202 of the transfer guide 204. When in the latter displaced position, the guide partitions 216 of the transfer member 200 are over the longitudinal ribs 208 of the transfer guide and accordingly are disposed between the guide partitions 80 of the article conveyor 10 to block further frictional advance of additional articles on the article conveyor 10 during the transfer operation.

It has been previously mentioned that the transfer operation requires closure of the microswitch 196 resultant from elevation of the elevator 180 signifying that an open carton is ready for reception of articles. An additional condition requisite for instigation of the transfer operation is the existence of a full complement of articles on the longitudinal ribs 208 of transfer guide 204. For this purpose, additional normally-open microswitches 232 are supported on the longitudinal ribs 208 at their ends remote from the article conveyor 10 so that the actuating arms 234 of such microswitches, as best shown in FIGS. 1 and 2, are engaged only when an abutting file of articles has accumulated on all of the receiving ribs 208. Preferably, to avoid excessive pressure against the microswitch arms 234, an associated rigid stop 236 is mounted on each of the longitudinal ribs 208. Such stop 236 also accurately locates the articles on the ribs 208 so that they are disposed laterally adjacent the guide channels 202 and accordingly will drop into such guide channels when the transfer member 200 moves laterally. When the transfer member 200 has completed its travel, another microswitch 238 is engaged to actuate return of the actuating cylinder 230 and the transfer member therewith.

As has been previously mentioned, the longitudinal and transverse ribs 202, 210 form the upper ends of the article guide channels 202. The remainer or lower portion of such guide channels 202 is formed by a plurality of spring fingers 240 which are secured on the longitudinal and transverse ribs and depend therefrom, four fingers being associated with each section of the grid to thus provide a resilient enclosure for each guide channel 202. Although such spring fingers 240 function to accurately guide the articles into a carton C thereunder, their resiliency effectively precludes breaking of frangible articles dropped therethrough and also eliminates tearing of any labels on the articles. To assist in the entry of the articles into the guide channels 202, the transverse ribs 210 of the grid-like transfer guide 204 carry at their upper ends arcuate plastic members 242, each of which curves upwardly to a position adjacent a respective longitudinal rib 208 of the transfer guide 204. Accordingly, when the articles in abutting relationship on the longitudinal ribs 208 are displaced laterally therefrom, the arcuate plastic members 242 effect slight separation of the articles to thus assure proper entry into the respective guide channels 202 but again effect such separation without damage either to the articles or any labels thereon.

The spring fingers 240 forming the lower ends of the guide channels 202 are arranged to enter a carton C raised by the carton elevator 16 and if such carton has partitions, each set of four fingers is arranged to enter one of the compartments formed by such partitions. Normally, the fingers 240 are disposed in substantially vertical dispositions. To facilitate ease of entry into the carton compartments, means are provided to temporarily squeeze each set of four fingers 240 inwardly at the same time that carton elevation is instigated. To effect such squeezing or closure of the fingers 240, flat rods 244, 246 are rotatably supported respectively under the longitudinal and transverse ribs 208, 210 of the grid-like transfer guide 204. When the flat sides of the rods 244, 246 are presented to the fingers, their substantially vertical dispositions will be maintained but when the rods are rotated through an angle of 90°, closure of the fingers is effected as shown in FIGS. 2 and 3. Rotation of the rods 244 is effected through suitable linkage as indicated at 248 in FIG. 2 which transfers the linear motion of a pneumatic actuating cylinder 250 to all of the flat rods 244 extending in one direction. A similar actuating cylinder 252 and connecting linkage 254 is arranged to effect rotation of the other perpendicularly disposed set of rods 246. Both cylinders 250, 252 are actuated simultaneously so that all fingers 240 are squeezed together at the same time.

These pneumatic actuating cylinders 250, 252 as well as the actuating cylinders 230, 188 for the transfer member 200 and the carton elevator 16 all are controlled by solenoid valves 260, 262, and 264 so that actuation is provided in response to the establishment of certain electrical circuits in which the described microswitches are integrated as diagrammatically shown in FIG. 4. One solenoid valve 260 associated with the carton elevator 16 includes a solenoid 260a whose energization moves the valve to raise the elevator 16. Such solenoid 260a is in a circuit including, in series, the nomally closed microswitch 174 on the carton guide rail 132 and the normally-open microswitch 172 adjacent the carton elevator 16 and between the conveyor chains 100, 102. The circuit also includes a voltage source 266 and a solenoid 262a arranged to energize solenoid valve 262 which in turn actuates the finger-closing cylinders 250, 252 to effect finger closure.

A second solenoid 260b arranged to actuate the valve 260 to lower the elevator is in series with the voltage source 266, and a solenoid 264b arranged to energize solenoid valve 264 to return the transfer member 200. Additionally, this same series circuit includes the normally-open microswitch 238 adjacent the transfer member 200 and an electrical time delay 268 which is made variable so that the energization time for both solenoids 260b and 264b can be controlled.

A solenoid 262b, arranged to energize solenoid valve 262 and open the fingers 240 is in a series circuit including the normally-open microswitch 196, which is closed by raising the elevator 16, and the voltage source 266.

This same microswitch 196 is also in a second circuit including the solenoid 264a which actuates the solenoid valve 264 to effect article-displacing movement of the transfer member 200 and also including, in series the four normally-open microswitches 232 adjacent the articles received by the transfer mechanism 12.

With reference to such circuits, as shown in FIG. 4, and the structural arrangement of the carton loading apparatus as depicted in FIGS. 1, 2 and 3, the operation of the apparatus can be explained. It will be assumed that both motors 54, 130 have been energized to actuate movement of the article conveyor 10 and carton conveyor 14 and that the voltage source 266 is connected in the described circuit. Additionally, a supply of articles, such as bottles, is being continuously delivered to the article conveyor 10 and a supply of appropriately dimensioned cartons C is similarly being delivered to the carton conveyor 14, the structures having been adjusted to accommodate the articles and cartons. A conveyed carton C effects closure of the normally-open microswitch 172 positioned in the carton path when it has advanced to a position over the carton elevator 16 and against the spring stop 166. Since the normally closed microswitch 174 on the guide rail 132 for the cartons is in series in the same actuating circuit, such circuit will be closed since no preceding carton is present. Consequently, solenoid 260a will be energized to actuate solenoid valve 260 and initiate upward movement of the elevator plate 180. At the same time, solenoid 262a is energized to actuate valve 262 and close the fingers 240, as shown in FIGS. 2 and 3. Thus, upward movement of the elevator 16 is instigated simultaneously with closure of the spring fingers 240 so that the latter may freely enter the compartments in the carton C. If a filled carton were still on the conveyor 14, and an empty carton moves against the microswitch in the elevator circuit, the elevator 16 will start moving upwardly only after that preceding filled carton has been moved by the carton conveyor 14 beyond its position of contact with the microswitch 174 on the guide rail 132 so that such switch can again close. It is to be observed that upward movement of the elevator 16 allows microswitch 172 to open and deenergize further valve movement, the valve 260 remaining in its "lift" position.

When the elevator 16 has reached its uppermost position, the hook 192a on the dependent rod 192 engages the microswitch 196 under the carton elevator 16 to close the same, which effects energization of the solenoid 262b associated with the spring finger valve 262 so that the rods are rotated and the spring fingers 240, as a result of their inherent resiliency, resume their open vertical dispositions and thus come into engagement with the sides of each carton compartment. Such engagement not only forms the guide channels 202 directly into the carton compartments but also serves to shift any carton C whose position was not precisely correct and thus assure alignment of the guide channels with the carton compartments.

The microswitch 196 engaged by the dependent hook 192a on the carton elevator 16 also is in series with the microswitches 232 at the ends of the longitudinal article supporting ribbs 208 so that when all of such switches are closed to signify that both a carton is in receiving position and articles have accumulated on the transfer grid, the solenoid 264a associated with the transfer valve 264 is energized to thus move the transfer member 200 and laterally displace all of the articles simultaneously whereupon the respective articles can drop downwardly through the guide channels 202 into the respective carton compartments thus to effect a rapid but accurate loading operation. The fall of the articles is cushioned by the pneumatic cylinder support of the elevator 16 so the breakage is avoided.

When the transfer member 200 completes its travel and the articles have been pushed into the guide channels 202 and have subsequently dropped in the carton C thereunder, the described microswitch 238 on the transfer frame is engaged by the transfer member 200 to energize the time delay unit 268. Depending upon the setting of such time delay unit 268, solenoid 264b is energized to actuate return of the transfer member 200 to its original position so that articles can again be received by the transfer mechanism 12 from the article conveyor 10 preparatory to a successive transfer operation. Simultaneously, solenoid 260b is energized to instigate lowering of the elevator 16 with the loaded carton thereon.

As the carton elevator 16 is lowered, the loaded carton engages the top of the angularly-disposed actuating arm 170 of the microswitch 172 adjacent the spring stop 166 to depress the same and temporarily preclude repeat energization of the elevator 16. Such microswitch arm 170 remains depressed until the carton conveyor 14 has received and moved the filled carton to the right as viewed in FIG. 3 to a position beyond the centrally-disposed elevator plate 180. The actuating arm 170 of the microswitch again springs to its 45° position and remains in such position until engaged by a successive carton which instigates the entire loading operation once more.

Various modifications and/or alterations may be made in the described structure without departing from the scope of the invention and the foregoing description of one embodiment is accordingly to be considered as exemplary and not in a limiting sense and the actual scope of the invention is to be indicated only by reference to the appended claim.

What is claimed is:

Carton loading apparatus which comprises means for conveying a plurality of articles in multi-file relationship to a transfer position, a transfer guide at the transfer position having a plurality of guide channels therein for directing articles into a carton to be loaded and arranged to receive articles from said conveying means at positions intermediate said guide channels, and a transfer member arranged for movement laterally relative to said transfer guide to displace the articles received by said guide into positions aligned with said guide channels, said transfer guide including arcuate article separating members curving downwardly in the direction of article displacement by said transfer member.

References Cited

UNITED STATES PATENTS

| | | | |
|---|---|---|---|
| 2,252,127 | 8/1941 | Kimball | 53—166 |
| 2,656,081 | 10/1953 | Davis | 53—248 X |
| 2,727,664 | 12/1955 | Ardell | 53—166 |
| 2,815,623 | 12/1957 | Holstebroe et al. | 53—58 |
| 2,819,576 | 1/1958 | Hendricks et al. | 53—248 X |
| 2,890,560 | 6/1959 | Nigrelli et al. | 53—382 |
| 2,957,287 | 10/1960 | Cella | 53—166 X |
| 3,052,071 | 9/1962 | Copping | 53—166 X |
| 3,121,301 | 2/1964 | Mizelle | 53—58 XR |
| 3,201,916 | 8/1965 | McGill | 53—382 |

TRAVIS S. McGEHEE, *Primary Examiner.*

FRANK E. BAILEY, *Examiner.*

R. J. ALVEY, P. H. POHL, *Assistant Examiners.*